(12) United States Patent
Yamaguchi et al.

(10) Patent No.: US 11,206,084 B2
(45) Date of Patent: Dec. 21, 2021

(54) DISPERSION COMPENSATION DESIGNING DEVICE, DISPENSION COMPENSATION METHOD, OPTICAL TRANSMISSION SYSTEM, AND PROGRAM

(71) Applicant: Nippon Telegraph and Telephone Corporation, Tokyo (JP)

(72) Inventors: Minoru Yamaguchi, Tokyo (JP); Kohei Saito, Tokyo (JP); Tsutomu Kubo, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/256,543

(22) PCT Filed: Jun. 26, 2019

(86) PCT No.: PCT/JP2019/025463
§ 371 (c)(1),
(2) Date: Dec. 28, 2020

(87) PCT Pub. No.: WO2020/008982
PCT Pub. Date: Jan. 9, 2020

(65) Prior Publication Data
US 2021/0159982 A1  May 27, 2021

(30) Foreign Application Priority Data
Jul. 5, 2018 (JP) .............................. JP2018-128028

(51) Int. Cl.
*H04B 10/2513* (2013.01)
*H04B 10/079* (2013.01)

(52) U.S. Cl.
CPC ... *H04B 10/2513* (2013.01); *H04B 10/07951* (2013.01); *H04B 10/07955* (2013.01)

(58) Field of Classification Search
None
See application file for complete search history.

(56) References Cited

U.S. PATENT DOCUMENTS

| 6,832,050 B1 * | 12/2004 | Clausen ........... H04B 10/25137 |
| | | 398/147 |
| 10,171,161 B1 * | 1/2019 | Cote .................. H04B 10/6161 |

(Continued)

OTHER PUBLICATIONS

Hopkins et al., Optimizing optical pre-dispersion using transmit DSP for mitigation of Kerr nonlinearities in dispersion managed cables, 2013 (Year: 2013).*

(Continued)

*Primary Examiner* — Jai M Lee
(74) *Attorney, Agent, or Firm* — Fish & Richardson P.C.

(57) ABSTRACT

[Problem] A signal distortion generated when a multi-level modulated optical signal is transmitted through an optical transmission path where optical amplifiers are scattered is suppressed and transmission quality is improved.
[Solution] An optical transmission system 20 includes Tx 21a to Tx 21n configured to transmit a multi-level modulated optical signal 32 to an optical fiber 25, optical amplifiers 26a to 26f configured to amplify the optical signal 32 transmitted through the optical fiber 25, the optical amplifiers 26a to 26f being scattered on the optical fiber 25, and Rx 24a to Rx 24n configured to receive the amplified optical signal 32 via the optical fiber 25. A pre-dispersion compensation unit 27 of each of the Tx 21a to Tx 21n performs pre-dispersion compensation on the transmitted optical signal 32, based on a pre-dispersion compensation ratio for determining a percentage of dispersion compensation to be performed in advance on a wavelength dispersion to be accumulated in the optical fiber 25, with respect to the dispersion compensation to narrow a bandwidth to be wid- (Continued)

ened by the wavelength dispersion during transmission of the optical signal 32 through the optical fiber 25.

16 Claims, 13 Drawing Sheets

(56) References Cited

U.S. PATENT DOCUMENTS

| | | | | |
|---|---|---|---|---|
| 10,313,014 | B2* | 6/2019 | Frankel | H04B 10/532 |
| 10,819,432 | B1* | 10/2020 | Oveis Gharan | H04B 10/07951 |
| 2004/0208617 | A1* | 10/2004 | Essiambre | H04B 10/25133 398/158 |
| 2015/0086218 | A1* | 3/2015 | Liu | H04B 10/2513 398/193 |

OTHER PUBLICATIONS

Fujisawa et al., "Mitigation of Intra-channel Nonlinear Distortions based on PAPR Reduction with CD Pre-compensation in Real-time 50Gbps PM-QPSK Transmission," 2012 17th Opto-Electronics and Communications Conference (OECC 2012) Technical Digest, Busan Korea, Jul. 2012, pp. 439-440.

* cited by examiner

DISPERSION COMPENSATION DESIGNING DEVICE, DISPENSION COMPENSATION METHOD, OPTICAL TRANSMISSION SYSTEM, AND PROGRAM

CROSS-REFERENCE TO RELATED APPLICATIONS

This application is a National Stage application under 35 U.S.C. § 371 of International Application No. PCT/JP2019/025463, having an International Filing Date of Jun. 26, 2019, which claims priority to Japanese Application Serial No. 2018-128028, filed on Jul. 5, 2018. The disclosure of the prior application is considered part of the disclosure of this application, and is incorporated in its entirety into this application.

TECHNICAL FIELD

The present disclosure relates to a dispersion compensation design apparatus, a dispersion compensation method, an optical transmission system, and a program, by which it is possible to suppress, by a wavelength dispersion compensation, a signal distortion generated by a non-linear effect when a multi-level modulated optical signal is transmitted through an optical fiber.

BACKGROUND ART

In optical transmission systems, there has been a need to increase a transmission capacity in response to an increase in communication traffic every year. As illustrated in FIG. 12, a first-generation electrical multiplexing time division multiplexing (TDM) technology in a period from about 1980 to 1995 requires a transmission capacity of about 100 Mbps to 10 Gbps. A second generation wavelength division multiplexing (WDM) technology and an optical amplification technology in a period from about 2000 to 2010 requires a transmission capacity of about 2.4 Gbps×80 waves to about 40 Gbps×40 waves. In the future, a third generation digital coherent technology in a period from about 2015 to 2025 requires a transmission capacity of about 100 Gbps×80 waves to 400 Gbps×40 waves. Furthermore, a transmission capacity of greater than 1 Tbps beyond this transmission capacity is desired.

To further improve the frequency utilization efficiency for transmission capacity exceeding 1 T, a transmission by a multi-modulation scheme such as 64 quadrature amplitude modulation (QAM) is studied. However, as illustrated in FIG. 13, if a multi-level degree of the multi-modulation scheme shifts from a quadrature phase shift keying (QPSK) indicated by aa line 11 to 8QAM indicated by a line 12, and to 16QAM indicated by a line 13, a signal distortion (or non-linear distortion) easily occurs due to a non-linear effect, and thus, transmission quality deteriorates.

Note that a horizontal axis in FIG. 13 is an energy per bit to noise power spectral density ratio (Eb/N0) indicating a ratio of energy per bit to noise power, and a vertical axis is a bit error rate (BER). A larger Eb/N0 is required to obtain an error rate that is equal to or less than a certain level in order to receive proper data.

As indicated by a bidirectional arrow Y1 that is constant at BER=$10^{-4}$, in a case of transitioning to a larger-capacity signal transmission scheme as indicated in the QPSK 11, 8QAM 12, and 16QAM 13, if a state where there is less noise by 4 dB (a better environment) is not achieved, an error rate identical to that in a small-capacity signal transmission scheme cannot be obtained in a large-capacity signal transmission scheme. That is, if the transmission capacity is increased as from the QPSK 11 to the 16QAM 13, the signal distortion due to the non-linear effect increases and the transmission quality indicated by the BER deteriorates.

As a technique for suppressing the signal distortion, a technique for performing a pre-dispersion compensation (Non Patent Literature 1) is proposed. A speed of light transmitted through an optical fiber varies depending on a wavelength (wavelength dispersion), and thus, an optical signal waveform is distorted, and the transmission capacity is limited. A dispersion compensation compensates for the distortion of the optical signal waveform. That is, a waveform is distorted to cancel the wavelength dispersion by performing a pre-dispersion compensation on a transmission side, and as a result, an appropriate signal can be received on a reception side.

CITATION LIST

Non Patent Literature

Non Patent Literature 1: S. Fujisawa, et. al., "Mitigation of intra-channel non-linear distortions based on PAPR reduction with CD pre-compensation in real-time 50 Gbps PM-QPSK transmission", OECC 2012, 5B1-1.

SUMMARY OF THE INVENTION

Technical Problem

However, while a peak to average power ratio (PAPR) is considered in the pre-dispersion compensation of Non Patent Literature 1, a light intensity of an optical signal transmitted through an optical fiber is not sufficiently considered. On the other hand, a propagation characteristic of signal light in a transmission direction, which is expressed by the non-linear Schrödinger equation represented in the following Equation (1), is phase-modulated from Equation (1) in accordance with the light intensity, as described below, and thus, the light intensity also needs to be considered.

[Math. 1]

$$\frac{dE_1}{dz} = i\gamma|E_1|^2 E_1 + 2i\gamma(|E_2|^2 + |E_3|^2 + |E_4|^2)E_1 + 2i\gamma E_2^* E_3 E_4 \exp(i\Delta\beta z) - \frac{1}{2}\alpha E_1 \quad (1)$$

In Equation (1), $E_1$ to $E_4$ indicate light intensities (electric field intensities) of optical signals having different frequencies illustrated in FIG. 14. Symbol i indicates phase information (imaginary), γ indicates a non-linear coefficient, Δβ indicates a phase mismatch amount, z indicates a propagation distance, and α indicates a loss coefficient. Note that iγ indicates a phase rotation.

$dE_1/dz$ on the left side indicates a change of the light intensity over the transmission distance. A first term on the right side indicates a self-phase modulation (SPM), a second term indicates a cross-phase modulation (XPM), and a third term indicates a four wave mixing (FWM).

The self-phase modulation of the first term means that the phase rotates with respect to the light intensity of the signal. That is, the phase modulation is performed by multiplying the light intensity of the signal light $|E_1|^2$ by a light intensity $E_1$. The cross-phase modulation of the second term means that the phase rotates with locally emitted light of another signal around the light intensities $E_2$ to $E_4$. The four wave mixing of the third term means that the light intensity $E_1$ overlaps with a new noise signal different from the light intensities $E_1$ to $E_4$ by the light intensities $E_2$ to $E_4$. "$(-1/2)*\alpha E_1$" of the fourth term means that the light intensity decreases ($\alpha$: loss factor) as the signal light is transmitted with a linear change rather than a non-linear change.

In the SPM and the XPM thus indicated by Equation (1), the phase modulation increases depending on the light intensities E1 to E4 of the signal light beams. As a result, there is a problem in that a bandwidth of the signal light widens, a signal distortion is generated, and transmission quality deteriorates.

The present disclosure has been made in view of such circumstances, and an object thereof is to provide a dispersion compensation design apparatus, a dispersion compensation method, an optical transmission system, and a program, by which it is possible to suppress a signal distortion generated when a multi-level modulated optical signal is transmitted through an optical transmission path where optical amplifiers are scattered, to improve a transmission quality.

Means for Solving the Problem

As a means for solving the above-described problem, the invention according to a first aspect is a dispersion compensation design apparatus configured to design in advance a dispersion compensation amount to be set for dispersion compensation for compensating wavelength dispersion of a multi-level modulated optical signal to be accumulated in an optical transmission path, the dispersion compensation amount being designed for a transmission device configured to transmit the optical signal to a reception device via the optical transmission path where optical amplifiers configured to amplify the optical signal are scattered, in which a pre-dispersion compensation ratio for determining a pre-dispersion compensation amount being a dispersion compensation amount for compensating the wavelength dispersion in advance is evaluated from a predetermined relationship between a light intensity of the optical signal to be transmitted through the optical transmission path and a PAPR being a ratio of a peak of the light intensity and an average power of signal light, and the pre-dispersion compensation amount is designed in accordance with the evaluated pre-dispersion compensation ratio.

The invention according to a seventh aspect is a dispersion compensation method performed by a dispersion compensation design apparatus configured to design in advance a dispersion compensation amount to be set for dispersion compensation for compensating wavelength dispersion of a multi-level modulated optical signal to be accumulated in an optical transmission path, the dispersion compensation amount being designed for a transmission device configured to transmit the optical signal to a reception device via the optical transmission path where optical amplifiers configured to amplify the optical signal are scattered, in which the method includes evaluating, by the dispersion compensation design apparatus, a pre-dispersion compensation ratio for determining a pre-dispersion compensation amount being a dispersion compensation amount for compensating the wavelength dispersion in advance, from a predetermined relationship between a light intensity of the optical signal to be transmitted through the optical transmission path and a PAPR being a ratio of a peak of the light intensity and an average power of signal light, and designing, by the dispersion compensation design apparatus, the pre-dispersion compensation amount in accordance with the evaluated pre-dispersion compensation ratio.

The invention according to an eighth aspect is a program for causing a computer serving as a dispersion compensation design apparatus for designing in advance a dispersion compensation amount to be set for dispersion compensation for compensating wavelength dispersion of a multi-level modulated optical signal to be accumulated in an optical transmission path, the dispersion compensation amount being designed for a transmission device configured to transmit the optical signal to a reception device via the optical transmission path where optical amplifiers configured to amplify the optical signal are scattered, to perform evaluating a pre-dispersion compensation ratio for determining a pre-dispersion compensation amount being a dispersion compensation amount for compensating the wavelength dispersion in advance, from a predetermined relationship between a light intensity of the optical signal to be transmitted through the optical transmission path and a PAPR being a ratio of a peak of the light intensity and an average power of signal light, and designing the pre-dispersion compensation amount in accordance with the evaluated pre-dispersion compensation ratio.

According to the configuration of the first aspect, the method of the seventh aspect, and the program of the eighth aspect, when the transmission device performs the pre-dispersion compensation in accordance with the pre-dispersion compensation amount designed by the dispersion compensation design apparatus, the multi-level modulated optical signal of which a bandwidth to be widened in the optical transmission path is narrowed in advance is transmitted. This suppresses the signal distortion generated by the wavelength dispersion during transmission, and thus, the transmission quality can be improved. As a result, the optical signal having an appropriate bandwidth in which the signal distortion is suppressed can be received by the reception device.

The invention according to a second aspect is the dispersion compensation design apparatus according to the first aspect, in which the pre-dispersion compensation ratio is evaluated so that a PPI being a transmission deterioration amount of the optical signal obtained by integrating a product of the light intensity and the PAPR with respect to a transmission distance of the optical transmission path is equal to or smaller than a previously defined threshold value or is made small.

According to this configuration, the pre-dispersion compensation can be performed in accordance with the pre-dispersion compensation ratio in which the PPI is equal to or smaller than the threshold value or is made small, and thus, the optical signal can be transmitted so that the transmission deterioration amount of the optical signal is suppressed to be small.

The invention according to a third aspect is the dispersion compensation design apparatus according to the second aspect, in which the threshold value is a value allowing for improvement of a Q value or a bit error rate of the optical signal to be received by the reception device when the PPI is equal to or less than the threshold value, improvement of the Q value or the bit error rate to an error correction limit where error-free transmission is possible in which the optical signal is to be received by the reception device without an error, or improvement of a wavelength dispersion amount by a dispersion compensation in the reception device.

According to this configuration, the pre-dispersion compensation can be performed in accordance with the pre-dispersion compensation ratio in which the PPI is equal to or less than the threshold value, and thus, any one of the improvements described above can be achieved, non-linear distortion of the optical signal can be suppressed, and appropriate reception is possible.

The invention according to a fourth aspect is the dispersion compensation design apparatus according to the second or third aspect, in which the light intensity of the optical signal in which the PPI is equal to or less than the threshold value or is made small is evaluated in accordance with amplification gains of the optical amplifiers and arrangement positions of the optical amplifiers on an optical transmission path.

According to this configuration, the light intensity variable by both the amplification gains and the arrangement positions of the optical amplifiers is determined so that the PPI is equal to or less than the threshold value or is made small. As a result, the pre-dispersion compensation can be performed in accordance with the pre-dispersion compensation ratio in which the PPI is equal to or less than the threshold value, and thus, non-linear distortion of the optical signal can be suppressed, and appropriate reception is possible.

The invention according to a fifth aspect is the dispersion compensation design apparatus according to the first aspect, in which, in a case where the optical signal is to be transmitted through the optical transmission path in both of uplink and downlink directions, the pre-dispersion compensation ratio is evaluated from a result obtained by applying a weighting value to the predetermined relationship between the PAPR and the light intensity of the optical signal in each of the both directions, and the pre-dispersion compensation amount is designed in accordance with the evaluated pre-dispersion compensation ratio.

According to this configuration, the influence of the bidirectionally transmitted optical signals on each other can be suppressed by the weighting value, and appropriate reception is possible by suppressing the non-linear distortion of the bidirectional optical signals.

The invention according to a sixth aspect is an optical transmission system including a transmission device configured to transmit a multi-level modulated optical signal to an optical transmission path, optical amplifiers configured to amplify the optical signal transmitted through the optical transmission path, the optical amplifiers being scattered on the optical transmission path, and a reception device configured to receive the amplified optical signal via the optical transmission path, in which in dispersion compensation for compensating wavelength dispersion of the optical signal to be accumulated in the optical transmission path, a pre-dispersion compensation ratio for determining a pre-dispersion compensation amount being a dispersion compensation amount for compensating the wavelength dispersion in advance is evaluated from a predetermined relationship between a light intensity of the optical signal to be transmitted through the optical transmission path and a PAPR being a ratio of a peak of the light intensity and an average power of signal light, the pre-dispersion compensation amount determined in accordance with the evaluated pre-dispersion compensation ratio is set to the transmission device, and the transmission device performs pre-dispersion compensation in accordance with the set pre-dispersion compensation amount.

According to this configuration, when the transmission device performs the pre-dispersion compensation in accordance with the pre-dispersion compensation amount, the multi-level modulated optical signal of which a bandwidth to be widened in the optical transmission path is narrowed in advance and transmitted, and thus, the signal distortion generated by the wavelength dispersion can be suppressed and the transmission quality can be improved.

Effects of the Invention

According to the present disclosure, it is possible to provide a dispersion compensation design apparatus, a dispersion compensation method, an optical transmission system, and a program, by which it is possible to suppress a signal distortion generated when a multi-level modulated optical signal is transmitted through an optical transmission path where optical amplifiers are scattered, to improve a transmission quality.

DESCRIPTION OF EMBODIMENTS

Figure 1:
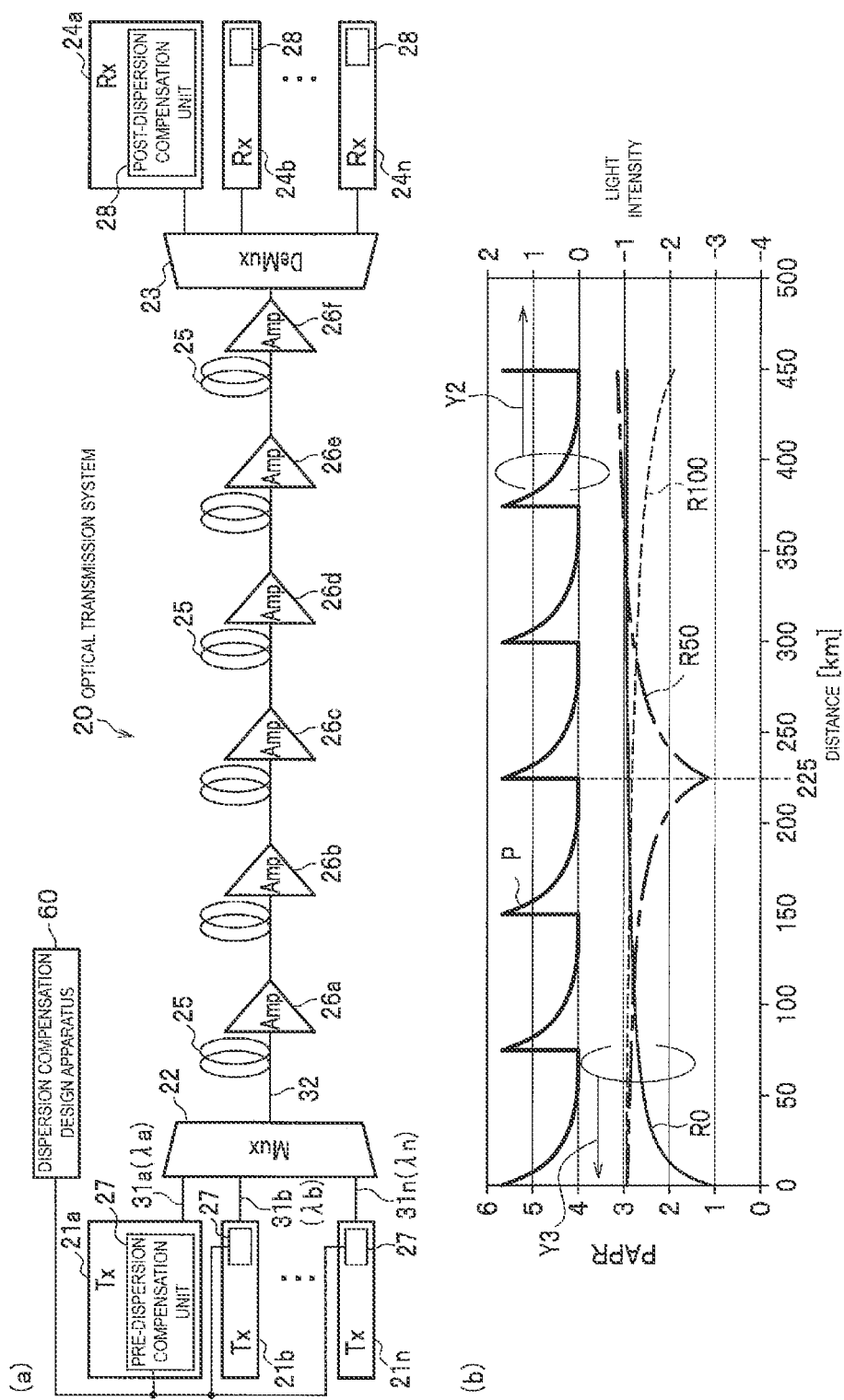
FIG. 1(a) is a block diagram illustrating a configuration of an optical transmission system according to a first embodiment of the present disclosure.
FIG. 1(b) is a graph illustrating an amplified light intensity of optical amplifiers scattered on an optical fiber of the optical transmission system and a peak to average power ratio (PAPR) at every distance in accordance with a pre-dispersion compensation ratio.

Embodiments of the present disclosure will be described below with reference to the drawings. Note that components common throughout the drawings of this specification are denoted by the same reference signs, and description of such components will be omitted as appropriate.

Configuration of First Embodiment

FIG. 1(a) is a block diagram illustrating a configuration of an optical transmission system according to a first embodiment of the present disclosure, and FIG. 1(b) is a graph illustrating an amplified light intensity of optical amplifiers scattered on an optical fiber of the optical transmission system and a peak to average power ratio (PAPR) at every distance in accordance with a pre-dispersion compensation ratio.

An optical transmission system 20 illustrated in FIG. 1(a) includes a plurality of optical transmitters (Txs) 21a, 21b, . . . , 21n, a multiplexer (Mux) 22, a demultiplexer (Demux) 23, a plurality of optical receivers (Rxs) 24a, 24b, 24n, an optical fiber 25 that connects the Mux 22 and the Demux 23, and optical amplifiers (Amps) 26a, 26b, 26c, 26d, 26e, and 26f inserted in the optical fiber 25 and scattered at predetermined intervals. The Tx 21a to Tx 21n each include a pre-dispersion compensation unit 27, and the Rx 24a to Rx 24n each include a post-dispersion compensation unit 28. A dispersion compensation design apparatus (also referred to as a design apparatus) 60 provided outside the Tx 21a to Tx 21n is connected to the pre-dispersion compensation units 27.

Note that the Tx 21a to Tx 21n and the Mux 22 constitute a transmission device according to the claims. The Rx 24a to Rx 24n and the Demux 23 constitute a reception device according to the claims. The optical fiber 25 constitutes an optical transmission path according to the claims.

The Txs 21a, 21b, . . . , 21n transmit, to the Mux 22, optical signals 31a, 31b, . . . , 31n having wavelengths λa, λb, . . . , λn having different frequencies from each other. The Mux 22 multiplexes the optical signals 31a to 31n and transmits an optical signal 32 being a multiplexed multi-level modulated optical signal, to the optical fiber 25. The optical amplifiers 26a to 26f amplify the optical signal 32 transmitted through the optical fiber 25. The Demux 23 demultiplexer the optical signal 32 into the optical signals 31a to 31n having the respective wavelengths λa to λn multiplexed on the optical signal 32. The Rx 24a to Rx 24n receive the demultiplexed optical signals 31a to 31n (reference signs omitted in the figure).

The dispersion compensation design apparatus 60 performs dispersion compensation design processing described below so that in addition to dispersion compensation for restoring a waveform distorted by wavelength dispersion during the transmission of the optical signal 32 in the optical fiber 25 only on the reception side, dispersion compensation is also performed in advance by the pre-dispersion compensation units 27 at the time of the transmission.

That is, in the dispersion compensation design processing, the design apparatus 60 predicts wavelength dispersion of the optical signal 32 to be transmitted on the basis of the characteristics of the optical fiber 25 and the optical amplifiers 26a to 26f being constitution elements of the optical transmission system 20 to evaluate in advance a pre-dispersion compensation amount of distorting the waveform of the optical signal 32 to be transmitted, so that the predicted wavelength dispersion is eliminated on the reception side. The design apparatus 60 sets the evaluated pre-dispersion compensation amount to each pre-dispersion compensation unit 27. Each pre-dispersion compensation unit 27 performs pre-dispersion compensation processing described later in accordance with the pre-dispersion compensation amount.

However, signal light has a characteristic in which the smaller the wavelength dispersion, the smaller the peak to average power ratio (PAPR). Thus, if the wavelength dispersion amount is adjusted at a front side (transmission side), the PAPR in the transmission path can be adjusted to be small at a predetermined distance. The design apparatus 60 designs the pre-dispersion compensation amount by using the pre-dispersion compensation so that the PAPR is small at a location where the light intensity is high and so that the light intensity is low at a location where the PAPR is high.

A pre-dispersion compensation ratio depends on the pre-dispersion compensation amount. The pre-dispersion compensation ratio is a percentage for compensating the wavelength dispersion at a front side (side of the Tx 21a to Tx 21n), with respect to the wavelength dispersion in the entire length (450 km) of the optical fiber 25 between the Mux 22 and the Demux 23 illustrated in FIG. 1(a). In other words, the pre-dispersion compensation ratio represents a percentage of the wavelength dispersion compensated at the front side, with respect to the wavelength dispersion to be accumulated in the transmission path of the optical fiber 25. That is, the design apparatus 60 evaluates the pre-dispersion compensation ratio, and determines the pre-dispersion compensation amount from the pre-dispersion compensation ratio.

The pre-dispersion compensation will be further described. The light intensity of the optical signal 32 indicated by a line P in FIG. 1(b) increases (is high) as a result of amplification by each of the optical amplifiers 26a to 26f and gradually attenuates (is low) until the optical signal 32 reaches the next optical amplifier. Note that, the optical signal 32 is also amplified by an optical amplifier (not illustrated) in the Mux 22 and the transmitted, and thus, the light intensity P is high. A right-direction arrow Y2 illustrated in FIG. 1(b) indicates that a level of the light intensity P is represented with a numerical scale on the right side of the graph.

A left-direction arrow Y3 indicates that a value of the PAPR obtained when the value of the pre-dispersion compensation ratio is R0, R50, or R100, is represented with a numerical scale on the left side of the graph. A solid line R0 indicates that a pre-dispersion compensation ratio R being a parameter is 0%. That is, the solid line R0 indicates that a post-dispersion compensation ratio is 100% when dispersion compensation is performed on a rear side (side of the Rx 24a to Rx 24n) without the dispersion compensation on the front side. A one-dot chain line R50 indicates that the pre-dispersion compensation ratio R is 50%. That is, the one-dot chain line R50 indicates that 50% of the dispersion compensation is performed at the front side. A dashed line R100 indicates that the pre-dispersion compensation ratio R is 100%. That is, the dashed line R100 indicates that 100% of the dispersion compensation is performed at the front side.

Figure 2:
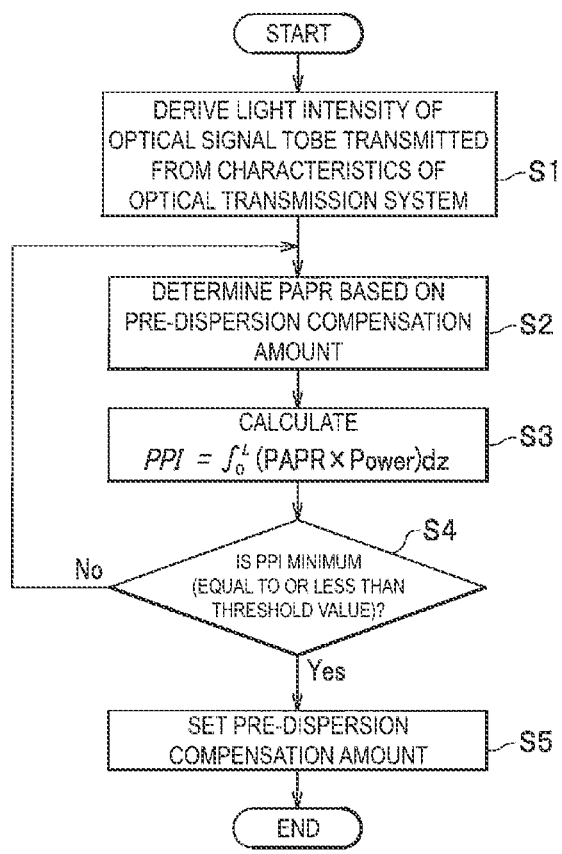
FIG. 2 is a flowchart for describing an operation of setting a pre-dispersion compensation amount for determining the pre-dispersion compensation ratio in the optical transmission system according to the first embodiment.

The pre-dispersion compensation amount for determining the pre-dispersion compensation ratio R described above is determined by the design apparatus 60 executing a procedure illustrated in the flowchart of FIG. 2. In other words, in an optical transmission system 10 illustrated in FIG. 1(b), if the optical fiber 25 and the scattered optical amplifiers 26a to 26f are fixed, the design apparatus 60 designs the pre-dispersion compensation amount as follows.

In step S1 of FIG. 2, the design apparatus 60 evaluates the light intensity P of the optical signal 32 to be transmitted through the optical fiber 25 (FIG. 1(b)) by known processing based on a loss factor representing a loss in accordance with a transmission distance of the optical fiber 25 in the optical transmission system 20, an optical fiber length, and arrangement positions and amplification gains of the optical amplifiers 26a to 26f. Note that the light intensity changes depending on the loss factor and the optical fiber length of the optical fiber 25 and the arrangement positions and the amplification gains of the optical amplifiers 26a to 26f.

Next, in step S2, the design apparatus 60 determines the PAPR in accordance with the pre-dispersion compensation amount designed on the basis of fixed values of the characteristics of the optical fiber 25 and the optical amplifiers 26a to 26f. For example, in the case of the pre-dispersion compensation ratio R50 in FIG. 1(b), the PAPR is lowest when the distance is about 225 km. Similarly, the PAPR value is lowest when the distance is 0 km in the case of R0, and when the distance is 450 km in the case of R100. The distance where the value of the PAPR is lowest is determined in accordance with the value of the pre-dispersion compensation amount. Note that in FIG. 1(a), an example is illustrated in which the optical amplifiers 26a to 26f are installed every 75 km, and thus, the optical signal is amplified by the optical amplifier 26c at a point of 225 km (where the PAPR of R50 is lowest).

Next, in step S3, the design apparatus 60 multiplies the light intensity evaluated in step S1 above with the PAPR evaluated in step S2 and integrates the product in a propagation direction (integration from 0 to L in the following Equation 2), to evaluate a transmission deterioration amount of the optical signal. The transmission deterioration amount of the optical signal is defined as a peak power integration (PPI, cumulative peak power) and is represented by following Equation (2). Note that the light intensity is expressed as Power.

[Math. 2]

$$PPI = \int_0^L (PAPR \times Power) dz \quad (2)$$

Next, in step S4, the design apparatus 60 determines whether the PPI (transmission deterioration amount of the optical signal) is equal to or less than a previously defined threshold value. If the PPI is greater than the threshold value, the determination indicates that the actual transmission quality largely deteriorate due to a high non-linear effect, and thus, the determination is performed to make the PPI small.

It is desirable to make the value of the PPI small; however, in practice, it is only required that the value of the PPI be equal to or less than a threshold value at which no problem occurs during operation. It is only required to set the threshold value of the PPI to a value at which a Q value or a BER of the optical signal 32 received by the Rx 24a to Rx 24n is improved, or the Q value or the BER is improved to an FEC limit that allows for error-free transmission, and the transmission deterioration is suppressed to a level where signal processing on the reception side such as a non-linear process is possible.

As a result of the determination in step S4, if the PPI exceeds the threshold value (No), the processing returns to step S2 and the pre-dispersion compensation amount is determined. In this case, in step S2, processing is performed to determine the pre-dispersion compensation amount so that the PPI is equal to or less than the threshold value while the pre-dispersion compensation ratio R is variable between 0% and 100%. Note that, if no condition is found on which the PPI is equal to or less than the threshold value, even if the pre-dispersion compensation ratio R is 100%, the PPI threshold value is reviewed and the processing is performed again. Further, in the present specification, the term "variable" is used to express a change.

That is, if the determination result in step S4 is equal to or less than the threshold value (Yes), the pre-dispersion compensation amount designed in step S2 is set to each pre-dispersion compensation unit 27 in step S5. Each pre-dispersion compensation unit 27 performs pre-dispersion compensation in accordance with the set pre-dispersion compensation amount.

Figure 3:
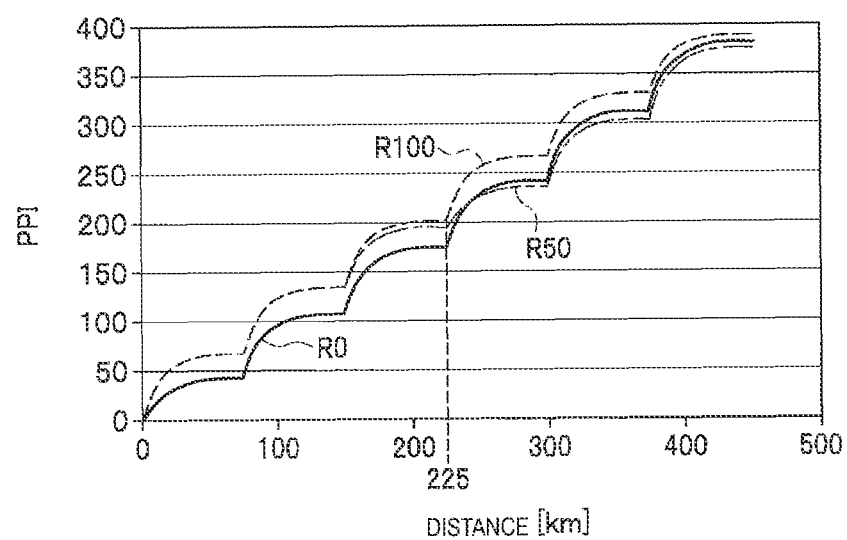
FIG. 3 is a graph illustrating a relationship between the distance of the optical fiber and a PPI when the pre-dispersion compensation ratio is varied.

Here, FIG. 3 illustrates a graph of the relationship between the distance of the optical transmission path (optical fiber 25) and the PPI when the pre-dispersion compensation ratio R is variable among R0 (0%), R50 (50%), and R100 (100%) as illustrated in FIG. 1(b) in step S2 described above.

In FIG. 1(b), the PPI is represented by integrating a product of the PAPR and the light intensity with respect to the distance, and thus, the PPI increases to protrude in a curved shape at positions of the optical amplifiers 26a to 26f (every time the optical signal is amplified by the optical amplifier), as illustrated in FIG. 3.

In the case of the pre-dispersion compensation ratio R0, in a range where the distance is short, the PAPR of the R0 is smaller than the PAPR of the R50 and the R100, and thus, the PPI of the R0 is also small.

On the other hand, in the case of the R100, the PAPR is small when the distance is far, and thus, the influence of the PAPR is small and the PPI of the R100 is larger than the PPI of the R0 and the R50 in the entire range.

In the case of the R50, the PAPR of the R50 is larger than the PAPR of the R0 in a range where the distance is short, and thus, the PPI of the R50 is large. However, a range where the PAPR of the R50 is small and a range where the light intensity is large overlap in a wide region. By this influence, the PPI of the R50 is smaller than the PPI of the R0 when the distance is far.

In the present example, over the entire length of 450 km, the PPI is smallest in the case of the pre-dispersion compensation ratio R50, and thus, the pre-dispersion compensation amount for determining that R is 50% is evaluated by the design apparatus 60 and set to each pre-dispersion compensation unit 27.

Next, the post-dispersion compensation unit 28 of each of the Rx 24a to Rx 24n illustrated in FIG. 1(a) will be described. Each post-dispersion compensation unit 28 performs post-dispersion compensation to return, to the original waveform, the optical signal 32 distorted by the wavelength dispersion in the transmission through the optical fiber 25.

Here, the pre-dispersion compensation amount on the transmission side is expressed as Dpre, and the post-dispersion compensation amount on the reception side is expressed as Dpost. Furthermore, when a cumulative wavelength dispersion amount over the entire length of the optical fiber 25 is expressed as Dtotal, the pre-dispersion compensation and the post-dispersion compensation are performed so as to satisfy Dtotal+Dpre+Dpost=0.

At this time, with the pre-dispersion compensation ratio R being −Dpre/Dtotal, the pre-dispersion compensation amount is set to each pre-dispersion compensation unit 27. As described above, the pre-dispersion compensation ratio R is determined to set the pre-dispersion compensation amount so that the PPI (transmission deterioration amount of the optical signal) in Equation (2) is equal to or less than the threshold value. Note that the pre-dispersion compensation ratio R may be determined to set the pre-dispersion compensation amount so that the PPI is lowest.

Figure 4:
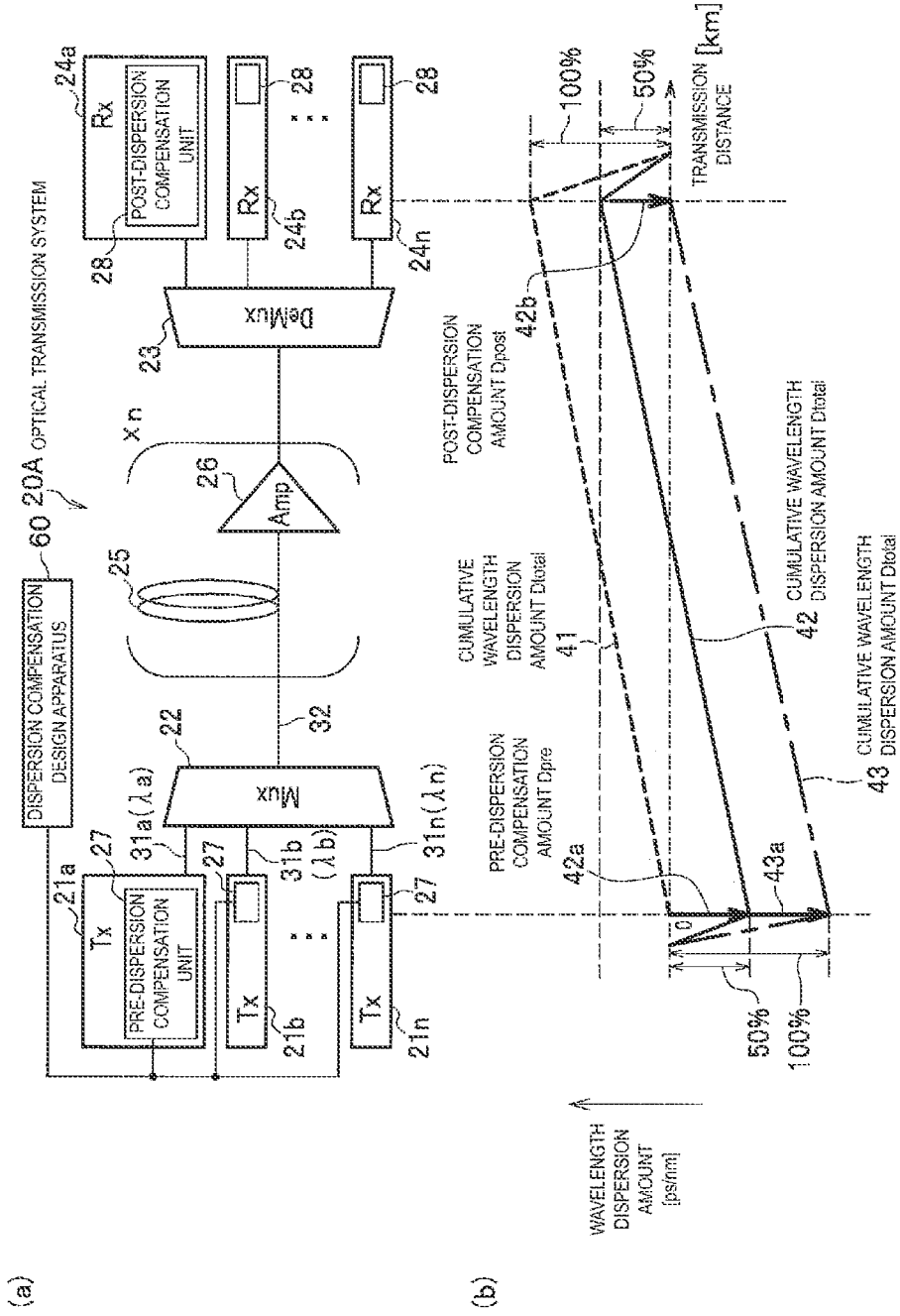
FIG. 4(a) is a block diagram illustrating a configuration of an optical transmission system according to an application example of the first embodiment.
FIG. 4(b) is a graph illustrating a cumulative pre-dispersion amount, where the horizontal axis represents a transmission distance of the optical fiber and the vertical axis represents a wavelength dispersion amount.

The post-dispersion compensation in which the pre-dispersion compensation ratio R is varied from 0% to 100% will be described with reference to FIGS. 4(a) and 4(b). FIG. 4(a) is a block diagram illustrating a configuration of an optical transmission system 20A, and FIG. 4(b) is a graph illustrating the cumulative wavelength dispersion amount Dtotal indicated by lines 41, 42, and 43 where the horizontal axis represents the transmission distance (km) of the optical fiber 25 and the vertical axis represents the wavelength dispersion (ps/nm). In the optical transmission system 20A, the optical amplifier 26 includes a predetermined number n of stages (in FIG. 1(a), the optical amplifiers 26a to 26f constitute six stages).

It is assumed that, in the design apparatus 60, the pre-dispersion compensation amount is evaluated and set to each pre-dispersion compensation unit 27 so that the pre-dispersion compensation ratio R is 0%. In this case, as illustrated by the dashed line 41 in FIG. 4(b), the cumulative wavelength dispersion amount Dtotal is gradually accumulated from "0" at the time of transmission by the Tx 21a to Tx 21n, and the highest wavelength dispersion amount is obtained at the time of reception by the Rx 24a to Rx 24n via the optical fiber 25. After reception by the Rx 24a to Rx 24n, each post-dispersion compensation unit 28 performs post-dispersion compensation, and thus, the wavelength dispersion amount is "0".

Next, it is assumed that, in the design apparatus 60, the pre-dispersion compensation amount is evaluated and set to each pre-dispersion compensation unit 27 so that the pre-dispersion compensation ratio R is 50%. In this case, as indicated by a downward arrow 42a in FIG. 4(b), 50% is compensated as the pre-dispersion compensation amount Dpre. Thus, the cumulative wavelength dispersion amount Dtotal starts from negative 50% and is gradually accumulated. Afterwards, the Dtotal exceeds the wavelength dispersion amount "0" as indicated by the solid line 42, and reaches a value including the remaining 50% of the pre-dispersion compensation amount immediately before reception. After receiving this value, each post-dispersion compensation unit 28 performs the post-dispersion compensation indicated by a downward arrow 42b, and thus, the wavelength dispersion amount is "0".

Next, it is assumed that, in the design apparatus 60, the pre-dispersion compensation amount is evaluated and set to each pre-dispersion compensation unit 27 so that the pre-dispersion compensation ratio R is 100%. In this case, as indicated by a downward arrow 43a in FIG. 4(b), 100% is compensated as the pre-dispersion compensation amount Dpre, and thus, the cumulative wavelength dispersion amount Dtotal starts from negative 100% and is gradually accumulated. Afterwards, the Dtotal is "0" immediately before reception as indicated by a solid line 43, and thus, the post-dispersion compensation is not performed.

Figure 5:
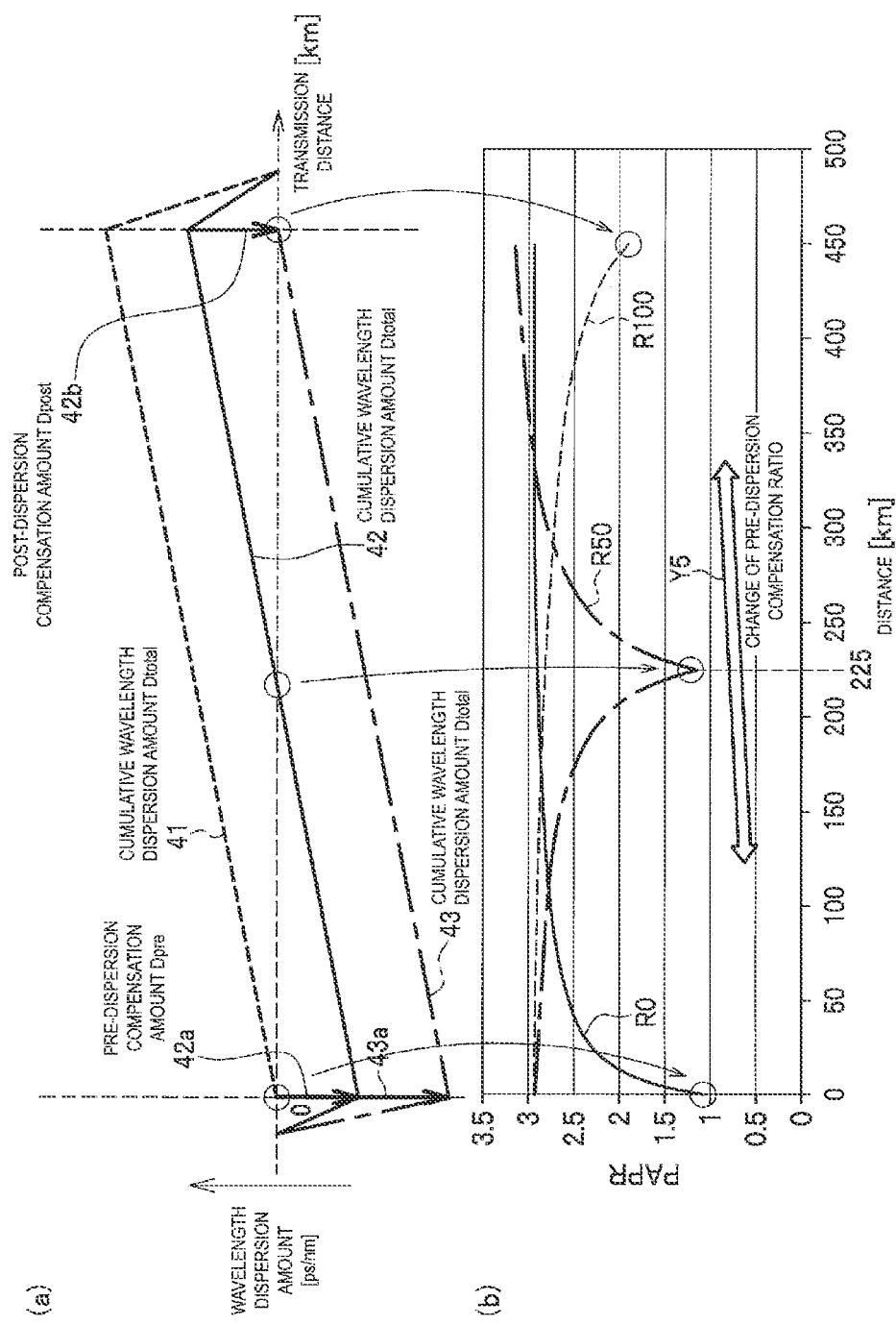
FIG. 5(a) is a graph illustrating a cumulative dispersion amount depending on a transmission distance.
FIG. 5(b) is a graph illustrating a change in a PAPR depending on the pre-dispersion compensation ratio, where the horizontal axis represents a transmission distance of the optical fiber and the vertical axis represents the PAPR.

A relationship between the cumulative wavelength dispersion amount Dtotal and the PAPR is illustrated in FIGS. 5(a) and 5(b). In the relationship between the cumulative wavelength dispersion amount Dtotal indicated by the lines 41, 42, and 43 and the PAPR indicated by the lines R0, R50, and R100, the PAPR increases as the Dtotal increases. However, when the Dtotal increases to a certain extent, the increase of the PAPR tends to flatten.

In a process in which Dtotal 41 in the case of the pre-dispersion compensation ratio R being 0% illustrated in FIG. 5(a) gradually increases from the time of transmission, the PAPR illustrated in FIG. 5(b) is lowest at the time of transmission. Afterwards, the PAPR rapidly increases in a range from 0 km to near 100 km, and then gradually increases until reaching a position of the optical amplifier 26f at the reception side (450 km). After that, the PAPR flattens.

In a process in which Dtotal 42 in the case of the pre-dispersion compensation ratio R being 50% illustrated in FIG. 5(a) starts from negative 50% of the wavelength dispersion amount and then gradually increases, the PAPR illustrated in FIG. 5(b) gradually decreases from near "3", decreases rapidly from around 150 km, and is lowest at 225 km, which is 50% of the total length. At this point, the wavelength dispersion amount of the Dtotal 42 illustrated in FIG. 5(a) is "0". Furthermore, the PAPR rapidly increases from this minimum and then gradually increases in a range from about 300 km to 450 km.

In a process in which Dtotal 43 in the case of the pre-dispersion compensation ratio R being 100% illustrated in FIG. 5(a) starts from negative 100% of the wavelength dispersion amount, and then gradually increases, the PAPR illustrated in FIG. 5(b) is relatively high at the beginning, but gradually decreases. When the Dtotal 43 is zero at the time of the final 450 km point, the PAPR is the lowest among all the pre-dispersion compensation ratios described above.

Among the pre-dispersion compensation ratios R0, R50, and R100 in which the PAPR changes in this way, when the integral is calculated from the distance of 0 km to 450 km, the integral value of the pre-dispersion compensation ratio R50 is lowest in which the integral value is lowest in the middle. Thus, a non-linear distortion due to the non-linear effect is also smallest, and the transmission deterioration is also reduced.

Further, when the pre-dispersion compensation ratio R is changed from 0% to 100%, the cumulative wavelength dispersion amount Dtotal illustrated in FIG. 5(a) changes in the range of the lines 41 to 43, and the PAPR illustrated in FIG. 5(b) changes in accordance with this change. For example, when R is 25%, the PAPR is lowest at 112.5 km, which is 25% of the total length of 450 km.

Note that a bidirectional arrow Y5 indicates that when the pre-dispersion compensation ratio R is changed, the distance where the PAPR is lowest also changes and that as the pre-dispersion compensation ratio R increases, that is, as the distance where the minimum value is obtained increases, a minimum value of the PAPR also increases.

Thus, when the pre-dispersion compensation ratio R is changed, the PAPR changes, and a product obtained by multiplying the changing PAPR and the light intensity changes. Thus, the PPI in Equation (2) above changes. Consequently, if the pre-dispersion compensation ratio R is changed from 0% to 100% and the pre-dispersion compensation amount is designed in accordance with the pre-dispersion compensation ratio R for which the PPI is lowest, the non-linear distortion due to the non-linear effect can be minimized. At this time, if the pre-dispersion compensation ratio R is less than 100%, each post-dispersion compensation unit 28 performs post-dispersion compensation.

Note that the post-dispersion compensation amount at the side of the Rx 24a to Rx 24n may be autonomously set by each post-dispersion compensation unit 28 that estimates the post-dispersion compensation amount, or may be set by the design apparatus 60. In this case, in the estimation of the post-dispersion compensation amount at the side of the Rx 24a to Rx 24n, for example, after the design apparatus 60 sets the pre-dispersion compensation amount to the pre-dispersion compensation units 27 of the Tx 21a to Tx 21n, a known training pulse may be transmitted, and the post-dispersion compensation units 28 may estimate the dispersion compensation amount on the basis of an optical signal of the training pulse received by the Rx 24a to Rx 24n.

Effects of First Embodiment

An effect obtained when the pre-dispersion compensation amount is designed by the dispersion compensation design apparatus 60 in the optical transmission system 20 (or 20A) according to the first embodiment will be described. The dispersion compensation design apparatus 60 designs in advance a dispersion compensation amount to be set for dispersion compensation for compensating wavelength dispersion of the optical signal 32 to be accumulated in the optical fiber 25. The dispersion compensation amount is set to the Tx 21a to Tx 21n configured to transmit the multi-level modulated optical signal 32 to the Rx 24a to Rx 24n via the optical fiber 25 in which the optical amplifiers 26a to 26f are scattered.

(1) The dispersion compensation design apparatus 60 is configured to evaluate, from a predetermined relationship between the light intensity of the optical signal 32 to be transmitted through the optical fiber 25 and the PAPR being a ratio of a peak of the light intensity and an average power of the signal light, the pre-dispersion compensation ratio R for determining the pre-dispersion compensation amount being a dispersion compensation amount for compensating the wavelength dispersion in advance, and to design the pre-dispersion compensation amount in accordance with the evaluated pre-dispersion compensation ratio R.

According to this configuration, the Tx 21a to Tx 21n perform pre-dispersion compensation in accordance with the pre-dispersion compensation amount designed by the dispersion compensation design apparatus 60, and thus, a multi-level modulated optical signal having a waveform to be distorted by wavelength dispersion in the optical transmission path is distorted before transmission to cancel the distortion in advance. This suppresses the signal distortion generated by the wavelength dispersion during transmission, and thus, the transmission quality can be improved. As a result, the optical signal 32 having an appropriate bandwidth in which the signal distortion is suppressed can be received by the Rx 24a to Rx 24n.

(2) The dispersion compensation design apparatus 60 is configured to evaluate the pre-dispersion compensation ratio so that the PPI, which is a transmission deterioration amount of the optical signal obtained by integrating the product of the light intensity and the PAPR with respect to the transmission distance of the optical fiber 25, is equal to or less than a previously defined threshold value or is made small.

According to this configuration, the optical signal 32 can be transmitted so that the transmission deterioration amount of the optical signal 32 is suppressed to be small.

(3) The threshold value is a value allowing for improvement of a Q value or a bit error rate of the optical signal 32 to be received by the Rx 24a to Rx 24n when the PPI is equal to or less than the threshold value, improvement of the Q value or the bit error rate to an error correction limit where error-free transmission is possible in which the optical signal 32 is to be received by the Rx 24a to Rx 24n without an error, or improvement of the wavelength dispersion amount in the Rx 24a to Rx 24n by the dispersion compensation.

As a result, if the PPI is equal to or less than the threshold value, it is possible to suppress the non-linear distortion of the optical signal 32 and appropriately receive the optical signal 32.

(4) The dispersion compensation design apparatus 60 is configured to evaluate the light intensity of an optical signal in which the PPI is equal to or less than a threshold value or is made small, in accordance with amplification gains of the optical amplifiers 26a to 26f and arrangement positions of the optical amplifiers 26a to 26f on the optical fiber 25.

According to this configuration, a portion of the optical signal 32 not subjected to pre-dispersion compensation by the dispersion compensation apparatuses of the Tx 21a to Tx 21n is processed so that the wavelength dispersion amount is zero in the post-dispersion compensation by the dispersion compensation apparatuses of the Rx 24a to Rx 24n. Thus, the optical signal 32 having an appropriate bandwidth in which the signal distortion is suppressed can be received by the Rx 24a to Rx 24n.

Note that parameters such as the numbers of the Tx 21a to Tx 21n, the Rx 24a to Rx 24n, and the optical amplifiers 26a to 26f, the insertion positions of the optical amplifiers 26a to 26f, the light intensity, the amplification ratios of the optical amplifiers 26a to 26f, the distance of the optical fiber 25, and the wavelength dispersion amount used in the description above and below are mere examples.

Further, it is only required that the dispersion compensation apparatus be arranged at a location where the dispersion compensation apparatus can set the pre-dispersion compensation amount to the Tx, and the dispersion compensation apparatus may be arranged within the Tx.

Configuration of Second Embodiment

Figure 6:
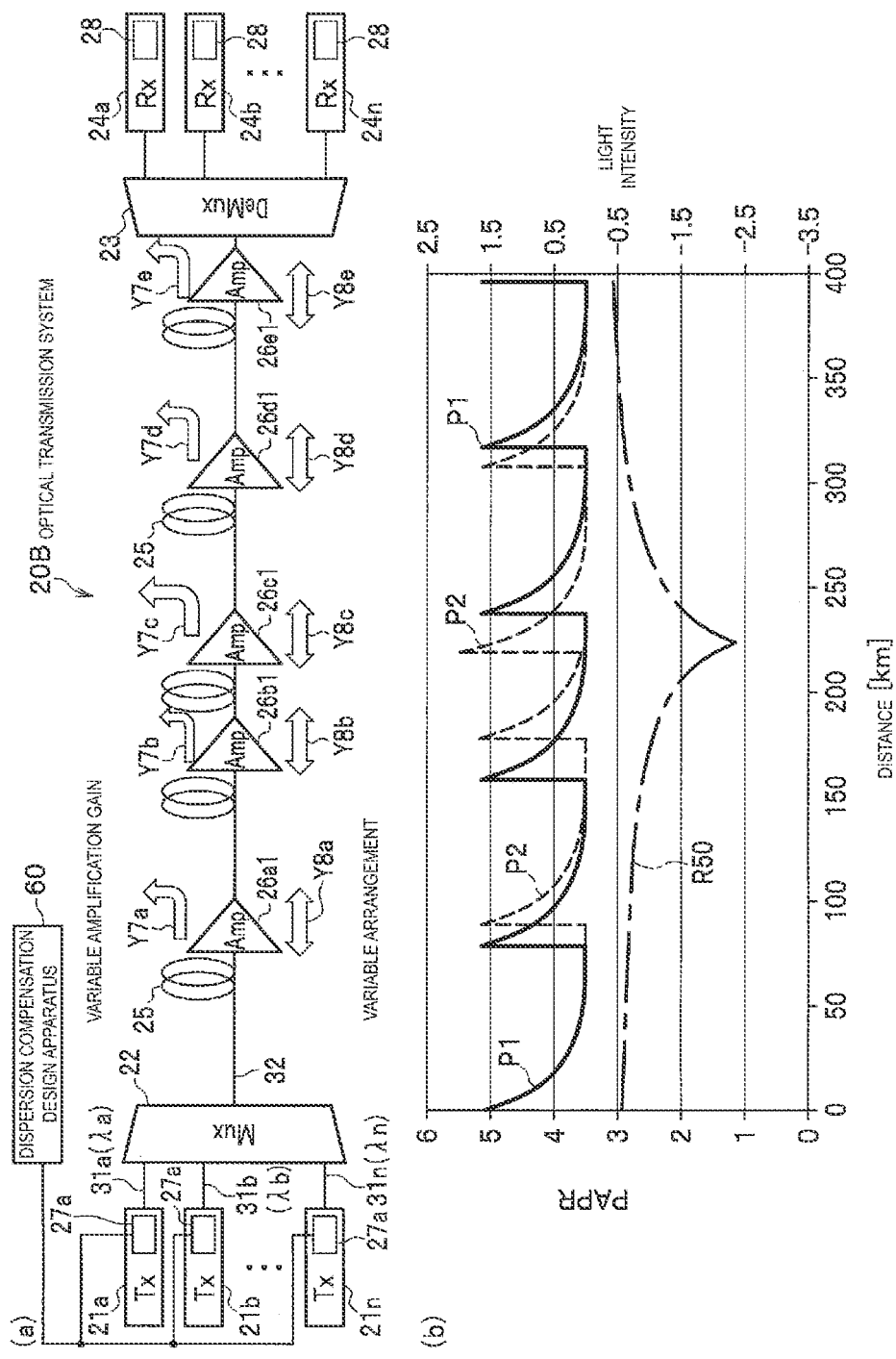
FIG. 6(a) is a block diagram illustrating a configuration of an optical transmission system according to a second embodiment of the present disclosure.
FIG. 6(b) is a graph illustrating two patterns of amplified light intensity of optical amplifiers scattered on the optical fiber of the optical transmission system and a PAPR for every distance when a pre-dispersion compensation ratio is constant.

FIG. 6(a) is a block diagram illustrating a configuration of an optical transmission system according to a second embodiment of the present disclosure, and FIG. 6(b) is a graph illustrating two patterns of amplified light intensity of optical amplifiers scattered on the optical fiber of the optical transmission system and the peak to average power ratio (PAPR) for every distance when the pre-dispersion compensation ratio is constant.

An optical transmission system 20B according to the second embodiment illustrated in FIG. 6(a) differs from the optical transmission system 20 according to the first embodiment (FIG. 1(a)) in that amplification gains of optical amplifiers 26a1 to 26e1 scattered on the optical fiber 25 are variable as indicated by arrows Y7a to Y7e, and arrangement positions of the optical amplifiers 26a1 to 26e1 are variable to shift to the transmission side or the reception side as indicated by arrows Y8a to Y8e.

However, it is assumed that, while the number of the optical amplifiers 26a to 26f in the optical transmission system 20 is six, the number of the optical amplifiers 26a1 to 26e1 in the optical transmission system 20B is five, and the distance from the Mux 22 to the last optical amplifier 26e1 is 400 km as illustrated in FIG. 6(b). Further, in the optical transmission system 20B, it is assumed that the Tx 21a to Tx 21n each include a pre-dispersion compensation unit 27a of which the pre-dispersion compensation amount is a fixed amount.

That is, in the optical transmission system 20B, it is not possible to vary the pre-dispersion compensation amount. However, when the amplification gains and arrangement positions of the optical amplifiers 26a1 to 26e1 can be varied, it is possible to vary the amplification gains and the arrangement positions to obtain a light intensity of the optical signal 32 so that the PPI (transmission deterioration amount of the optical signal) is equal to or less than a threshold value (or is made small). This operation will be described with reference to the flowchart of FIG. 7.

Note that it is assumed that the pre-dispersion compensation amount designed by the design apparatus 60 is a fixed amount when the pre-dispersion compensation ratio R is constant at 50%. The pre-dispersion compensation ratio R of 50% is illustrated in the graph of FIG. 6(b) by a line R50. Consequently, the peak to average power ratio (PAPR) in the case of the pre-dispersion compensation ratio R50 is defined as in the graph.

Figure 7:
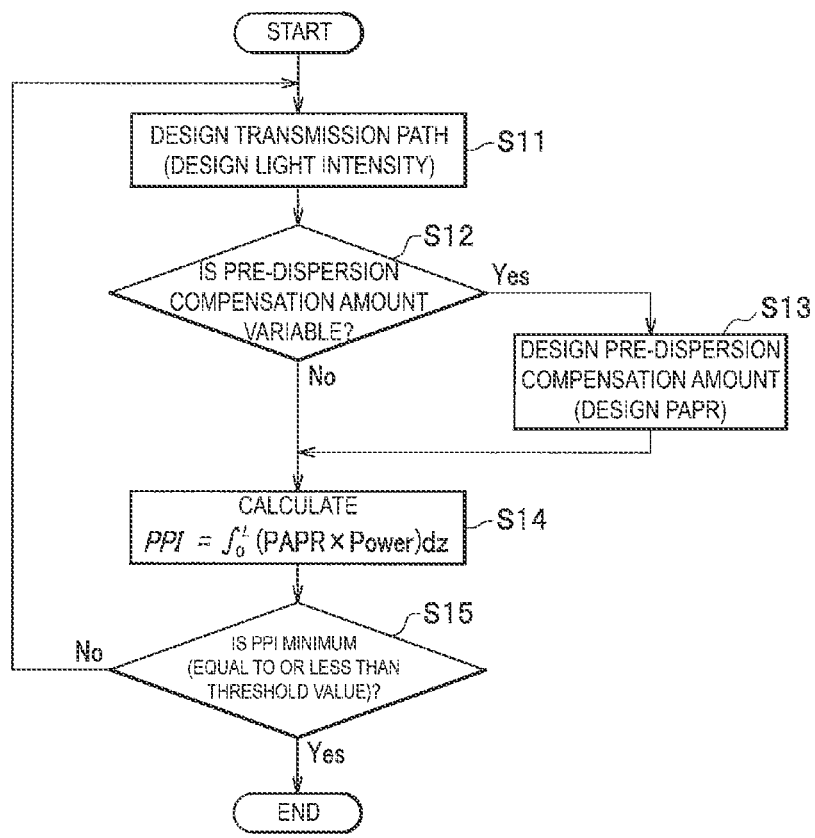
FIG. 7 is a flowchart for describing an operation of obtaining a light intensity of an optical signal in which the PPI is equal to or less than a threshold value by varying amplification gains and arrangement positions of the optical amplifiers in a case where a pre-dispersion compensation amount is not variable and in a case where the pre-dispersion compensation amount is variable, in the optical transmission system.

In step S11 of FIG. 7, a transmission path for setting (designing) the light intensity is designed. First, it is assumed that the light intensity determined depending on the amplification gain and arrangement position of each of the optical amplifiers 26a1 to 26e1 scattered on the optical fiber 25 is a light intensity indicated by a line P1 in FIG. 6(b).

Next, in step S12, the design apparatus 60 determines whether the pre-dispersion compensation amount is variable, and, in this case, the pre-dispersion compensation amount is a fixed amount, and thus, the processing proceeds to step S14. Note that step S13 will be described in a third embodiment described below.

In step S14, the design apparatus 60 multiplies the light intensity P1 evaluated in step S11 above by the PAPR determined by the pre-dispersion compensation ratio R50 being a fixed value, and integrates the product in the propagation direction to evaluate the PPI (transmission deterioration amount of the optical signal).

Figure 8:
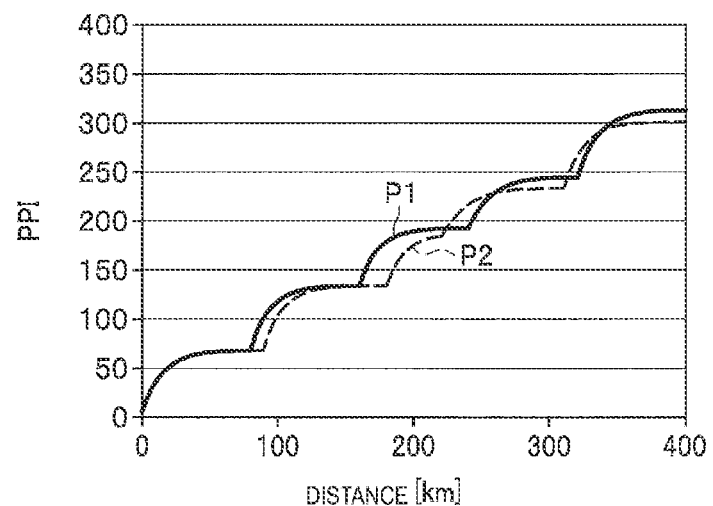
FIG. 8 is a graph illustrating a relationship between the PPI and the distance of an optical fiber of an optical fiber where two patterns of amplified light intensity of optical amplifiers scattered on the optical fiber of a transmission system are used as parameters.

The graph in FIG. 8 illustrates a relationship between the distance of the optical fiber 25 and the PPI with the light intensity P1 and a light intensity P2 described below as parameters. In FIG. 8, the PPI for the light intensity P1 increases to protrude in a curved shape at every position (every distance) of the optical amplifiers 26a1 to 26e1 scattered on the optical fiber 25.

Next, in step S15, the design apparatus 60 determines whether the PPI is equal to or less than a previously defined threshold value. As a result, it is assumed that the PPI exceeds the threshold value (No). In this case, the processing returns to step S11 described above, the transmission path is redesigned, and a new light intensity is evaluated as follows.

For example, the optical amplifier 26c1 has an increased amplification gain and is arranged at an arrangement position shifted to the reception side. The optical amplifiers 26a1 and 26b1 have unchanged amplification gains and are arranged at arrangement positions shifted to the transmission side. The optical amplifier 26d1 has an unchanged amplification gain and is arranged at an arrangement position shifted to the reception side. Further, the optical amplifier 26e1 has an unchanged amplification gain and is arranged at an unchanged arrangement position. The light intensity determined in this state is indicated by a dashed line P2 in FIG. 6(b).

Next, in step S14, after the processing proceeds through step S12, each pre-dispersion compensation unit 27a multiplies the light intensity P2 obtained in step S11 above by the PAPR and then integrates the product to evaluate the PPI.

Next, in step S15, when the design apparatus 60 determines that the PPI is equal to or less than a previously defined threshold value (Yes), if the PPI is equal to or less than the threshold value (Yes), the design apparatus 60 sets the pre-dispersion compensation amount determined in step S2 to each pre-dispersion compensation unit 27 at this time, in step S5. The amplification gains and arrangement positions of the optical amplifiers 26a1 to 26e1 designed in step S11 are set to the optical fiber 25. The signal distortion of the optical signal 32 to be transmitted through the optical fiber 25 is suppressed in accordance with this setting, and thus, the optical signal 32 having an appropriate bandwidth can be received by the Rx 24a to Rx 24n.

Configuration of Third Embodiment

Figure 9:
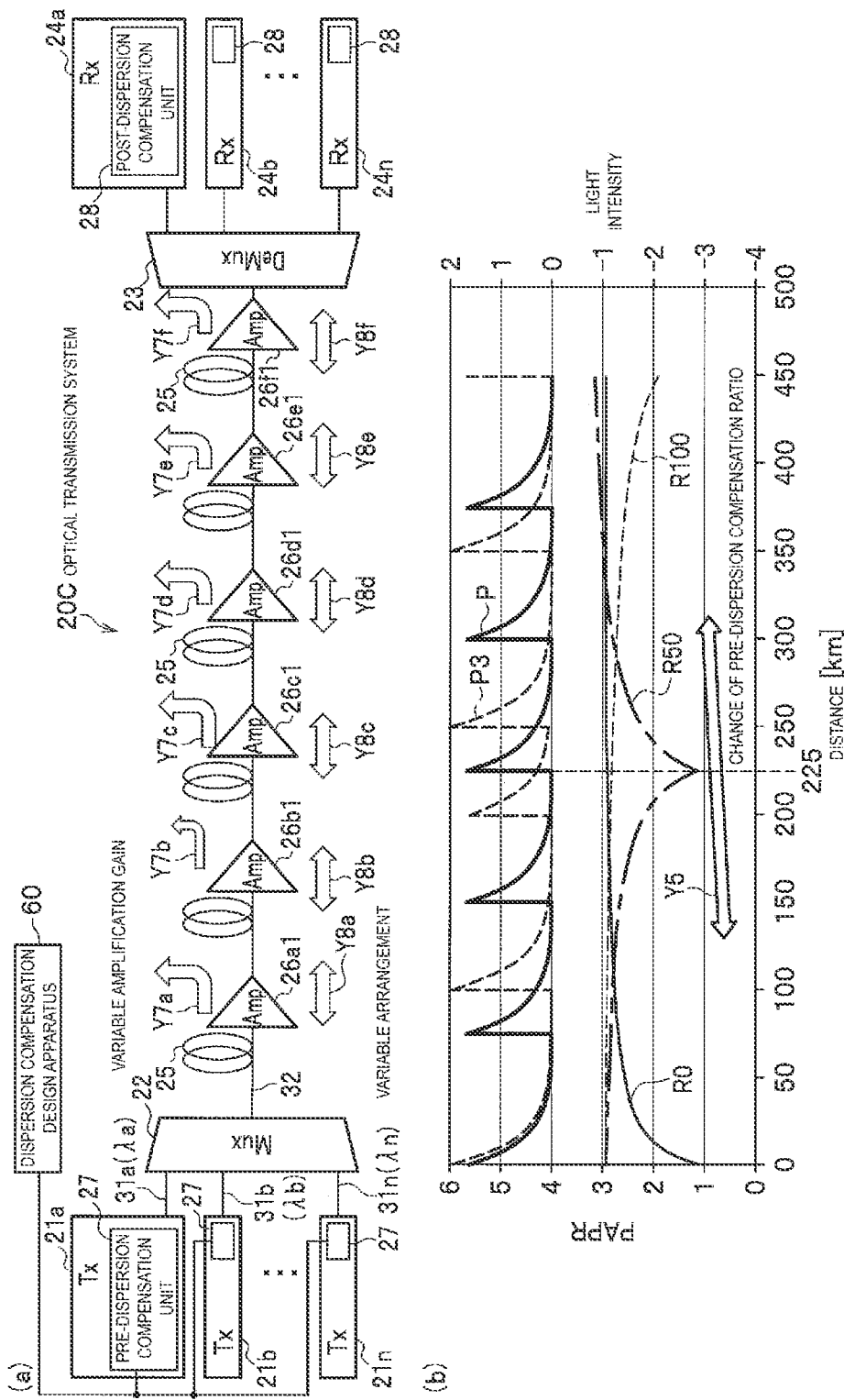
FIG. 9(a) is a block diagram illustrating a configuration of an optical transmission system according to a third embodiment of the present disclosure.
FIG. 9(b) is a graph illustrating two patterns of amplified light intensity of optical amplifiers scattered on the optical fiber of the optical transmission system and a PAPR for every distance in accordance with every pre-dispersion compensation ratio.

FIG. 9(a) is a block diagram illustrating a configuration of an optical transmission system according to a third embodiment of the present disclosure, and FIG. 9(b) is a graph illustrating two patterns of amplified light intensity of optical amplifiers scattered on the optical fiber of the optical transmission system and the PAPR for every distance in accordance with every pre-dispersion compensation ratio.

An optical transmission system 20C according to the third embodiment illustrated in FIG. 9(a) differs from the optical transmission system 20 according to the first embodiment (FIG. 1(a)) in that amplification gains of optical amplifiers 26a1 to 26f1 scattered on the optical fiber 25 are variable as indicated by arrows Y7a to Y7f, and arrangement positions of the optical amplifiers 26a1 to 26f1 are variable to shift to the transmission side or to the reception side as indicated by arrows Y8a to Y8f.

In the configuration of the optical transmission system 20C, similarly to the first embodiment, the pre-dispersion compensation amount are variable, and the amplification gains and the arrangement positions of the optical amplifiers 26a1 to 26f1 are variable. In this configuration, the pre-dispersion compensation amount, the amplification gains, and the arrangement positions mentioned above are varied, so that a light intensity of the optical signal 32 is obtained in which the PPI (transmission deterioration amount of the optical signal) is equal to or less than a threshold value (or is made small). This operation will be described with reference to the flowchart of FIG. 7.

In the graph illustrated in FIG. 9(b), the pre-dispersion compensation ratios R0, R50, and R100 and the light intensity P indicated by a solid line are identical to those in FIG. 1(b); however, FIG. 9(b) and FIG. 1(b) differ in a light intensity P3 indicated by a dashed line. The light intensity P3 is a light intensity obtained when the amplification gains and the arrangement positions of the optical amplifiers 26a1 to 26f1 are changed to a predetermined state.

In step S11 of FIG. 7, a transmission path for setting (designing) the light intensity is designed. First, it is assumed that the light intensity determined depending on the amplification gains and arrangement positions of the optical amplifiers 26a1 to 26f1 scattered on the optical fiber 25 is the light intensity indicated by a line P in FIG. 9(b).

Next, in step S12, the design apparatus 60 determines whether the pre-dispersion compensation amount is variable. In this case, the pre-dispersion compensation amount can be varied (Yes), and thus, the processing proceeds to step S13.

Next, in step S13, the design apparatus 60 determines the pre-dispersion compensation amount. For example, as illustrated at 225 km in FIG. 9(b), in the case of the pre-dispersion compensation ratio R50, the PAPR is small at a location where the light intensity P is high, and the pre-dispersion compensation amount is determined so that the peak may be large at a location where the average power of the PAPR is small as described earlier. This pre-dispersion compensation amount inevitably determines the PAPR.

In step S14, the design apparatus 60 multiplies the light intensity P evaluated in step S11 above by the PAPR determined in accordance with the pre-dispersion compensation amount for R50, and integrates the product in the propagation direction to evaluate the PPI.

Figure 10:
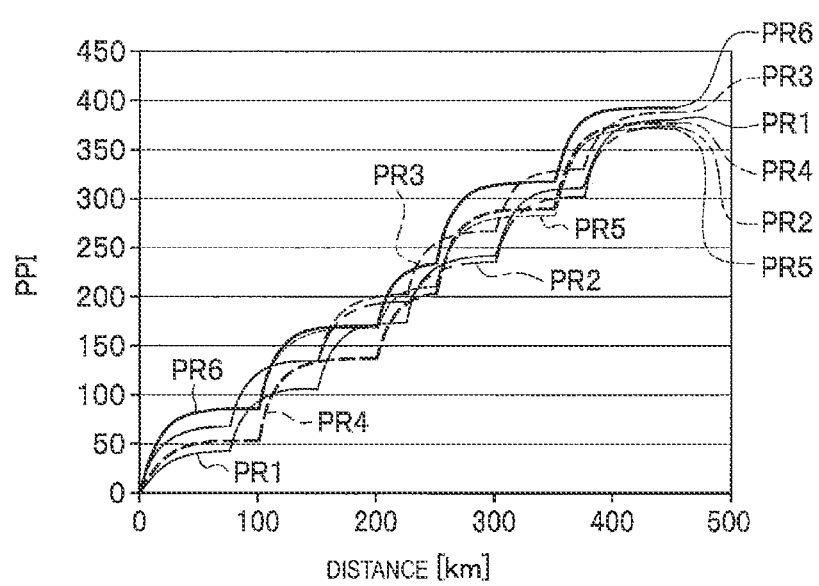
FIG. 10 is a graph illustrating PPI curves for the light intensity and the PAPR of various types of pre-dispersion compensation ratios, where the vertical axis represents the PPI and the horizontal axis represents the distance of the optical fiber.

Thus, a curve of the PPI (PPI curve) obtained by integrating the product of the light intensity P and the PAPR for R50 is indicated by reference numeral PR2 in FIG. 10. PPI curves PRI to PR6 illustrated in FIG. 10 are parameters indicating the PPI with respect to the distance of the optical fiber 25.

The PPI curve PRI indicates a PPI obtained by integrating the product of the light intensity P and the PAPR for R0. The PPI curve PR2 indicates a PPI obtained by integrating the product of the light intensity P and the PAPR for R50. The PPI curve PR3 indicates a PPI obtained by integrating the product of the light intensity P and the PAPR for R100. The PPI curve PR4 indicates a PPI obtained by integrating the product of the light intensity P3 described below and the PAPR for R0. The PPI curve PR5 indicates a PPI obtained by integrating the product of the light intensity P3 and the PAPR for R50. The PPI curve PR6 indicates a PPI obtained by integrating the product of the light intensity P3 and the PAPR for R100.

Each of the PPI curves PR1 to PR6 increases to protrude in a curved shape at every position (every distance) of the optical amplifiers 26a1 to 26f1 scattered on the optical fiber 25.

Next, in step S15 of FIG. 7, the design apparatus 60 determines whether the PPI is equal to or less than the previously defined threshold value. As a result, it is assumed that the PPI exceeds the threshold value (No). In this case, the processing returns to step S11 described above, the transmission path is redesigned, and a new light intensity is evaluated as follows.

In the redesign, the optical amplifiers 26b1 and 26f1 have the unchanged amplification gains and are arranged at the unchanged arrangement positions. The optical amplifier 26a1 has an increased amplification gain, and is arranged at the arrangement position shifted to the reception side. The optical amplifier 26c1 has the unchanged amplification gain, and is arranged at the arrangement position shifted to the transmission side. Each of the optical amplifiers 26d1 and 26e1 has an increased amplification gain, and is arranged at the arrangement position shifted to the transmission side. The light intensity determined in this state is indicated by a dashed line P3 in FIG. 9(b).

Next, in step S13, after the processing proceeds through Yes in step S12, the design apparatus 60 integrates the product of the light intensity P3 evaluated in step S11 above and the PAPR for each of the pre-dispersion compensation ratios R0, R50, and R100 to evaluate the PPI. Here, it is determined whether the PPI is equal to or less than the threshold value in step S15. If no condition is found on which the PPI is equal to or less than the threshold value even when the pre-dispersion compensation ratio R is 100%, the threshold value of the PPI is reviewed and the process is performed again.

Next, in step S15, it is assumed that the design apparatus 60 determines that the PPI is equal to or less than the threshold value (Yes). The PPI for each of the PAPRs at the light intensity P3 is indicated by each of the PPI curves PR4 to PR6 in FIG. 10. The PPI curve PR5 is lowest at 450 km corresponding to the reception end. That is, the PPI obtained by integrating the product of the light intensity P3 and the PAPR for R50 is lowest.

Consequently, the amplification gains and the arrangement positions of the optical amplifiers 26a1 to 26f1 redesigned in step S11 to maintain the PPIs are set to the optical fiber 25. The signal distortion of the optical signal 32 to be transmitted through the optical fiber 25 is suppressed in accordance with this setting, and thus, the optical signal 32 having an appropriate bandwidth can be received by the Rx 24a to Rx 24n.

Configuration of Fourth Embodiment

Figure 11:
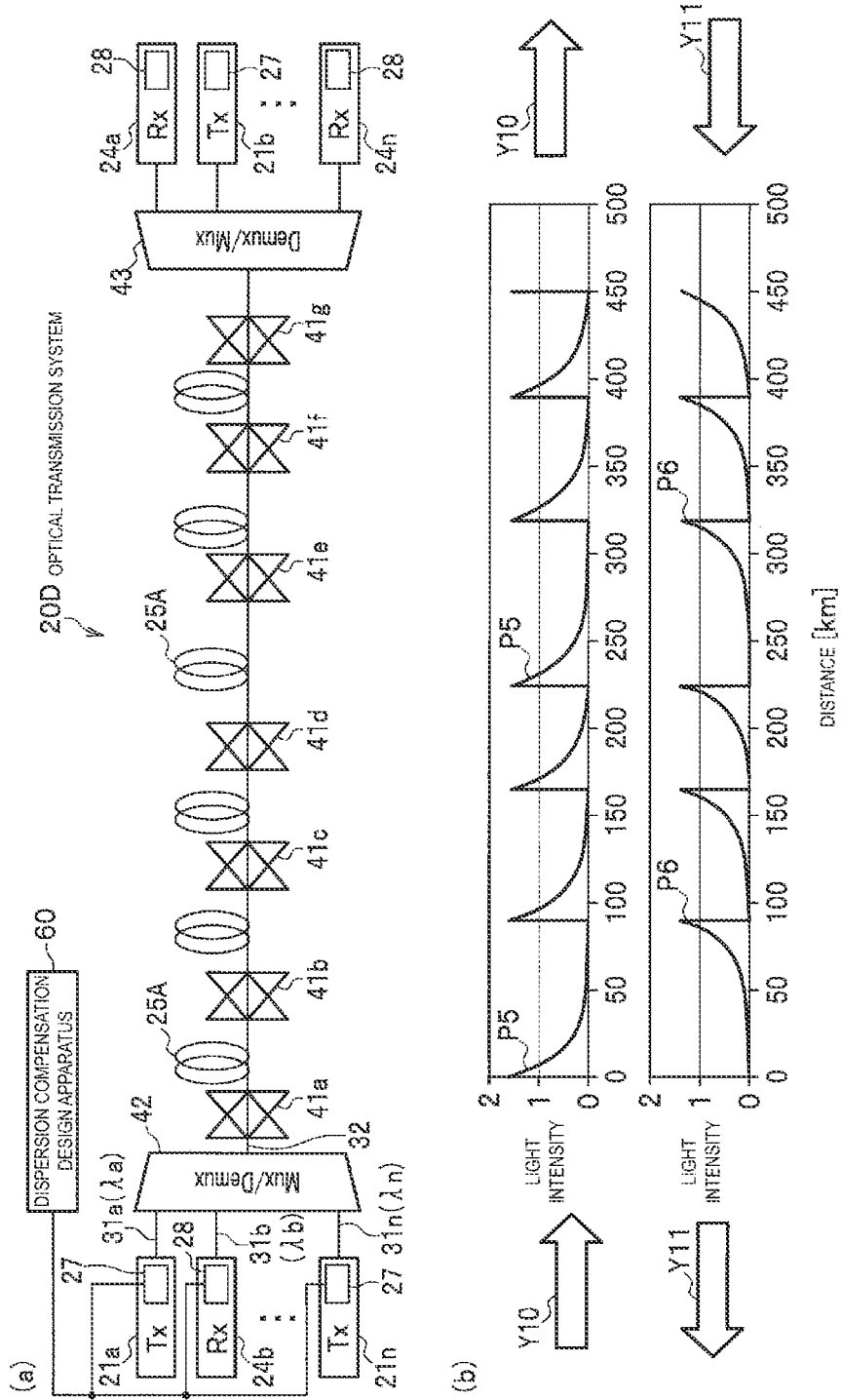
FIG. 11(a) is a block diagram illustrating a configuration of an optical transmission system according to a fourth embodiment of the present disclosure.
FIG. 11(b) is a graph illustrating an uplink amplified light intensity and a downlink amplified light intensity of optical amplifiers scattered on the optical fiber of the optical transmission system.
Figure 12:
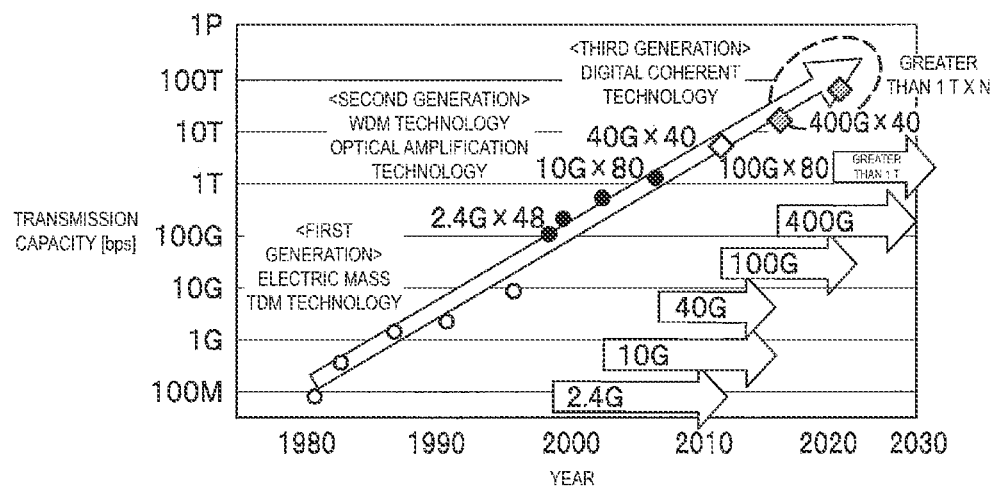
FIG. 12 is a graph illustrating a transmission capacity of communication traffic for every year in an optical transmission system.
Figure 13:
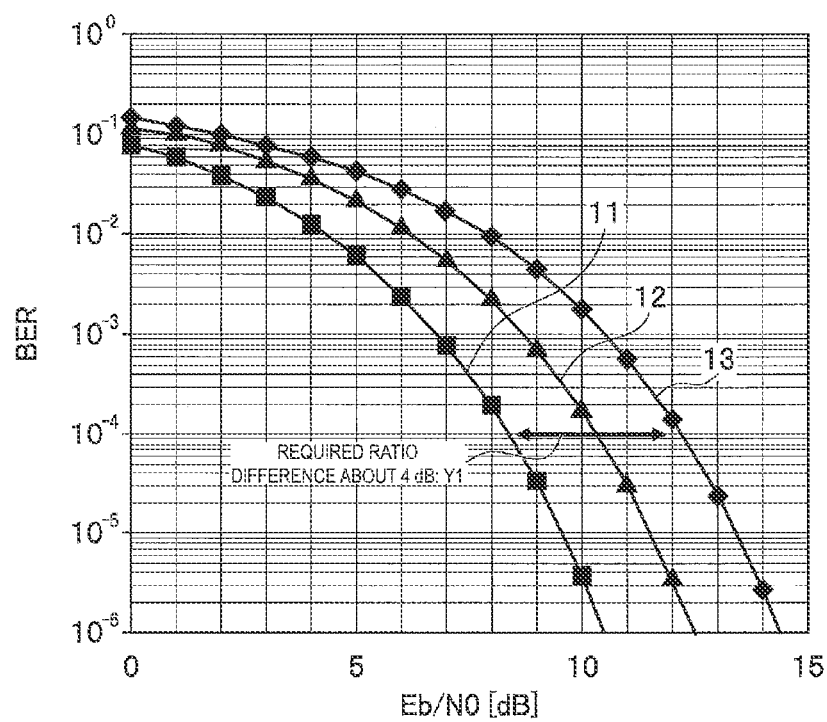
FIG. 13 is a graph illustrating a multi-level degree of a multi-level modulation scheme, where the vertical axis represents BER and the horizontal axis represents Eb/N0.
Figure 14:
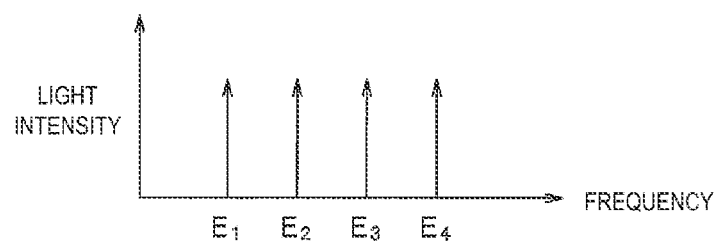
FIG. 14 is a spectral diagram illustrating the light intensities of optical signals having different frequencies.

FIG. 11(a) is a block diagram illustrating a configuration of an optical transmission system according to a fourth embodiment of the present disclosure, and FIG. 11(b) is a graph illustrating an uplink amplified light intensity and a downlink amplified light intensity of the optical amplifiers scattered on the optical fiber of the optical transmission system.

An optical transmission system 20D according to the fourth embodiment illustrated in FIG. 11(a) differs from the optical transmission system 20 according to the first embodiment (FIG. 1(a)) in that an optical fiber 25A is a single-core bidirectional optical fiber, and optical amplifiers 41a to 41g can bidirectionally amplify the optical signal 32. Consequently, a Mux/Demux 42 is arranged on one end side and a Mux/Demux 43 is arranged on the other end side. The Tx 21a and the Tx 21n and the Rx 24b are mixedly connected to the Mux/Demux 42, and the Rx 24a and the Rx 24n and the Tx 21b on the opposite side are mixedly connected to the Demux/Mux 43. Note that the Mux/Demux 42, the Tx 21a and the Tx 21n, and the Rx 24b configure the transmission/reception devices described in the claims. The Demux/Mux 43, the Rx 24a and the Rx 24n, and the Tx 21b configure the transmission/reception devices described in the claims.

As indicated by an arrow Y10 in FIG. 11(b), if the optical signal 32 is amplified by the optical amplifiers 41a to 41g when the optical signal 32 is transmitted to the uplink, the light intensity rapidly increases at the optical amplifiers 41a to 41g and gradually decreases after the optical signal 32 is output from the optical amplifiers 41a to 41g, as indicated by a line P5.

On the other hand, as indicated by an arrow Y11 in the opposite direction of the arrow Y10, if the optical signal 32 is amplified by the optical amplifiers 41g to 41a when the optical signal 32 is transmitted to the downlink, the light intensity rapidly increases at the optical amplifiers 41g to 41a and gradually decreases after the optical signal 32 is output from the optical amplifiers 41g to 41a, as illustrated by a line P6.

If a total of two of the optical fibers 25 illustrated in FIG. 1 are laid for the uplink and the downlink, the uplink optical signal 32 and the downlink optical signal 32 can be separated, and thus, it is possible to set the PPI in the uplink to be equal to or less than a threshold value (or at a minimum), and the PPI in the downlink to be equal to or less than a threshold value. However, in a single-core bidirectional fiber as the optical fiber 25A illustrated in FIG. 11(a), the uplink and downlink optical signals 32 affect each other, and thus, it is not possible to minimize both the PPI in the uplink and the PPI in the downlink simply by determining the pre-dispersion compensation ratio so that the PPIs in the uplink and the downlink are equal to or less than the threshold value.

Thus, in the optical transmission system 20D, the pre-dispersion compensation units 27 facing each other via the optical fiber 25A multiply the PPI in the uplink by a weighting value and multiply the PPI in the downlink by a weighting value. Furthermore, each pre-dispersion compensation unit 27 performs pre-dispersion compensation of each of the uplink and the downlink in accordance with a pre-dispersion compensation ratio in which a sum of the resultant product and a product obtained in the opposite side is equal to or less than a previously defined threshold value (or is a minimum). Thus, the influence of the uplink and downlink optical signals 32 on each other can be suppressed by the weighting value, and thus, it is possible to suppress a non-linear distortion of both the uplink and downlink optical signals 32 to appropriately receive the optical signals 32.

Next, a program for executing a computer according to the present embodiment will be described. It is assumed that the computer is the dispersion compensation design apparatus 60 for designing in advance a dispersion compensation amount to be set for dispersion compensation for compensating wavelength dispersion of the multi-level modulated optical signal 32 to be accumulated in the optical fiber 25, and that the dispersion compensation amount is set to a transmission device (Tx 21a to Tx 21n and Mux 22) configured to transmit the multi-level modulated optical signal 32 to a reception device (Demux 23 and Rx 24a to Rx 24n) via the optical fiber 25 in which the optical amplifiers 26a to 26f configured to amplify the optical signal 32 are scattered.

The program causes the computer to function as means for evaluating, from a predetermined relationship between the light intensity of the optical signal 32 to be transmitted through the optical fiber 25 and the PAPR being a ratio of a peak of a light intensity and an average power of the signal light, the pre-dispersion compensation ratio for determining the pre-dispersion compensation amount being a dispersion compensation amount for compensating the wavelength dispersion in advance, and means for designing the pre-dispersion compensation amount in accordance with the evaluated pre-dispersion compensation ratio.

According to this program, an effect similar to the effect of the design apparatus 60 according to the first embodiment described above can be obtained.

In addition, a specific configuration can be changed as appropriate without departing from the spirit of the present disclosure.

In the description above, the dispersion compensation is performed by the Txs and the Rxs. However, the dispersion compensation may be performed electrically by signal processing of a digital signal processor (DSP), or may be performed by an optical device such as a dispersion compensation fiber. Furthermore, the dispersion compensation may be achieved by inserting an optical device for dispersion compensation into the transmission path of an optical fiber. In this case, it is only required to design the pre-dispersion compensation ratio R so that the overall PPI is made small by the plurality of Txs (optical signals). Further, in the description above, compensation is performed with a dispersion compensation amount so that the wavelength dispersion of the optical transmission path is zero. However, it is only required to perform compensation so that the PPI is made small, and the compensation does not necessarily need to result in a wavelength dispersion of zero.

In a long-distance non-relay transmission using a remotely pumped amplifier or the like, non-linear phenomena are strongly manifested due to using high power signals and Raman amplification in addition to the remotely pumped amplifier. In particular, in an undersea transmission system where an optical fiber is laid on the sea ground, it is difficult to change the transmission path, and thus, it is important to design in advance the configuration of the optical transmission system according to the second to fourth embodiments described above. When a device of the transmission system is renewed in an existing optical fiber, a design to perform the pre-dispersion compensation as described in the first embodiment is important. Consequently, the above-described pre-design may be performed.

REFERENCE SIGNS LIST 20, 20A, 20B, 20C, 20D Optical transmission system
21a to 21n Tx (optical transmitter)
22 Mux (multiplexer)
23 Demux (demultiplexer)
24a to 24n Rx (optical receiver)
25, 25A Optical fiber
26a to 26f, 26a1 to 26f1, 41a to 41g Optical amplifier
27, 27a Pre-dispersion compensation unit
28 Post-dispersion compensation unit
32 Optical signal
41 to 43 Cumulative wavelength dispersion amount
42a Pre-dispersion compensation amount
42b Post-dispersion compensation amount
60 Dispersion compensation design apparatus
P, P1 to P3, P5, P6 Light intensity
R0, R50, R100 Pre-dispersion compensation ratio

The invention claimed is:

1. A dispersion compensation design apparatus configured to design in advance a dispersion compensation amount to be set for dispersion compensation for compensating wavelength dispersion of a multi-level modulated optical signal to be accumulated in an optical transmission path, the dispersion compensation amount being designed for a transmission device configured to transmit the optical signal to a reception device via the optical transmission path where optical amplifiers configured to amplify the optical signal are scattered, wherein a pre-dispersion compensation ratio for determining a pre-dispersion compensation amount being a dispersion compensation amount for compensating the wavelength dispersion in advance is evaluated from a predetermined relationship between a light intensity of the optical signal to be transmitted through the optical transmission path and a peak to average power ratio (PAPR) being a ratio of a peak of the light intensity and an average power of signal light, and the pre-dispersion compensation amount is designed in accordance with the evaluated pre-dispersion compensation ratio.

2. The dispersion compensation design apparatus according to claim 1, wherein the pre-dispersion compensation ratio is evaluated so that a peak power integration (PPI) being a transmission deterioration amount of the optical signal obtained by integrating a product of the light intensity and the PAPR with respect to a transmission distance of the optical transmission path is equal to or smaller than a previously defined threshold value or is made small.

3. The dispersion compensation design apparatus according to claim 2, wherein the threshold value is a value allowing for improvement of a Q value or a bit error rate of the optical signal to be received by the reception device when the PPI is equal to or less than the threshold value, improvement of the Q value or the bit error rate to an error correction limit where error-free transmission is possible in which the optical signal is to be received by the reception device without an error, or improvement of a wavelength dispersion amount by a dispersion compensation in the reception device.

4. The dispersion compensation design apparatus according to claim 2, wherein the light intensity of the optical signal in which the PPI is equal to or less than the threshold value or is made small is evaluated in accordance with amplification gains of the optical amplifiers and arrangement positions of the optical amplifiers on an optical transmission path.

5. The dispersion compensation design apparatus according to claim 1, wherein, in a case where the optical signal is to be transmitted through the optical transmission path in both of uplink and downlink directions, the pre-dispersion compensation ratio is evaluated from a result obtained by applying a weighting value to the predetermined relationship between the PAPR and the light intensity of the optical signal in each of the both directions, and the pre-dispersion compensation amount is designed in accordance with the evaluated pre-dispersion compensation ratio.

6. A dispersion compensation method performed by a dispersion compensation design apparatus configured to design in advance a dispersion compensation amount to be set for dispersion compensation for compensating wavelength dispersion of a multi-level modulated optical signal to be accumulated in an optical transmission path, the dispersion compensation amount being designed for a transmission device configured to transmit the optical signal to a reception device via the optical transmission path where optical amplifiers configured to amplify the optical signal are scattered, wherein the method comprises:
  evaluating, by the dispersion compensation design apparatus, a pre-dispersion compensation ratio for determining a pre-dispersion compensation amount being a dispersion compensation amount for compensating the wavelength dispersion in advance, from a predetermined relationship between a light intensity of the optical signal to be transmitted through the optical transmission path and a PAPR being a ratio of a peak of the light intensity and an average power of signal light; and
  designing, by the dispersion compensation design apparatus, the pre-dispersion compensation amount in accordance with the evaluated pre-dispersion compensation ratio.

7. The method according to claim 6, further comprising: providing the transmission device configured to transmit the optical signal; optical amplifiers configured to amplify the optical signal transmitted through the optical transmission path, the optical amplifiers being scattered on the optical transmission path; and the reception device configured to receive the amplified optical signal via the optical transmission path, wherein the transmission device performs pre-dispersion compensation in accordance with the pre-dispersion compensation amount.

8. The method according to claim 6, wherein the pre-dispersion compensation ratio is evaluated so that a peak power integration (PPI) being a transmission deterioration amount of the optical signal obtained by integrating a product of the light intensity and the PAPR with respect to a transmission distance of the optical transmission path is equal to or smaller than a previously defined threshold value or is made small.

9. The method according to claim 8, wherein the threshold value is a value allowing for improvement of a Q value or a bit error rate of the optical signal to be received by the reception device when the PPI is equal to or less than the threshold value, improvement of the Q value or the bit error rate to an error correction limit where error-free transmission is possible in which the optical signal is to be received by the reception device without an error, or improvement of a wavelength dispersion amount by a dispersion compensation in the reception device.

10. The method according to claim 8, wherein the light intensity of the optical signal in which the PPI is equal to or less than the threshold value or is made small is evaluated in accordance with amplification gains of the optical amplifiers and arrangement positions of the optical amplifiers on an optical transmission path.

11. The method according to claim 6, wherein, in a case where the optical signal is to be transmitted through the optical transmission path in both of uplink and downlink directions, the pre-dispersion compensation ratio is evaluated from a result obtained by applying a weighting value to the predetermined relationship between the PAPR and the light intensity of the optical signal in each of the both directions, and the pre-dispersion compensation amount is designed in accordance with the evaluated pre-dispersion compensation ratio.

12. A non-transitory computer readable medium storing one or more instructions for causing a computer serving as a dispersion compensation design apparatus configured to design in advance a dispersion compensation amount to be set for dispersion compensation for compensating wavelength dispersion of a multi-level modulated optical signal to be accumulated in an optical transmission path, the dispersion compensation amount being designed for a transmission device configured to transmit the optical signal to a reception device via the optical transmission path where optical amplifiers configured to amplify the optical signal are scattered, to perform:
  evaluating a pre-dispersion compensation ratio for determining a pre-dispersion compensation amount being a dispersion compensation amount for compensating the wavelength dispersion in advance, from a predetermined relationship between a light intensity of the optical signal to be transmitted through the optical transmission path and a PAPR being a ratio of a peak of the light intensity and an average power of signal light; and designing the pre-dispersion compensation amount in accordance with the evaluated pre-dispersion compensation ratio.

13. The non-transitory computer readable medium according to claim 12, wherein the pre-dispersion compensation ratio is evaluated so that a peak power integration (PPI) being a transmission deterioration amount of the optical signal obtained by integrating a product of the light intensity and the PAPR with respect to a transmission distance of the optical transmission path is equal to or smaller than a previously defined threshold value or is made small.

14. The non-transitory computer readable medium according to claim 13, wherein the threshold value is a value allowing for improvement of a Q value or a bit error rate of the optical signal to be received by the reception device when the PPI is equal to or less than the threshold value, improvement of the Q value or the bit error rate to an error correction limit where error-free transmission is possible in which the optical signal is to be received by the reception device without an error, or improvement of a wavelength dispersion amount by a dispersion compensation in the reception device.

15. The non-transitory computer readable medium according to claim 13, wherein the light intensity of the optical signal in which the PPI is equal to or less than the threshold value or is made small is evaluated in accordance with amplification gains of the optical amplifiers and arrangement positions of the optical amplifiers on an optical transmission path.

16. The non-transitory computer readable medium according to claim 12, wherein, in a case where the optical signal is to be transmitted through the optical transmission path in both of uplink and downlink directions, the pre-dispersion compensation ratio is evaluated from a result obtained by applying a weighting value to the predetermined relationship between the PAPR and the light intensity of the optical signal in each of the both directions, and the pre-dispersion compensation amount is designed in accordance with the evaluated pre-dispersion compensation ratio.

* * * * *